United States Patent
Cheong (10) Patent No.: US 10,801,575 B2
(45) Date of Patent: Oct. 13, 2020

(54) VALVE STRUCTURE OF SHOCK ABSORBER

(71) Applicant: MANDO CORPORATION, Pyeongtaek-si, Gyeonggi-do (KR)

(72) Inventor: Moon Sang Cheong, Iksan-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 137 days.

(21) Appl. No.: 15/987,297

(22) Filed: May 23, 2018

(65) Prior Publication Data
US 2018/0340589 A1 Nov. 29, 2018

(30) Foreign Application Priority Data

May 24, 2017 (KR) .................. 10-2017-0064260

(51) Int. Cl.
*F16F 9/348* (2006.01)
*F16F 9/512* (2006.01)
*F16K 31/122* (2006.01)

(52) U.S. Cl.
CPC ............ *F16F 9/348* (2013.01); *F16F 9/3485* (2013.01); *F16F 9/5126* (2013.01);
(Continued)

(58) Field of Classification Search
CPC ....... F16K 31/1226; F16F 9/062; F16F 9/512; F16F 9/516; F16F 9/34; F16F 9/464; F16F 9/3488; F16F 9/3221; F16F 9/348; F16F 9/5126; F16F 9/3485; F16F 9/3484; F16F 6/00; F16F 2222/06; F16F 2228/066; F16F 2230/0023
(Continued)

(56) References Cited

U.S. PATENT DOCUMENTS 5,293,971 A * 3/1994 Kanari .................... F16F 9/468
188/282.1
8,069,964 B2 * 12/2011 Deferme ............... F16F 9/3481
188/322.22
(Continued)

FOREIGN PATENT DOCUMENTS

| CN | 103851120 A | 6/2014 |
| KR | 2002-0045774 A | 6/2002 |
| KR | 10-2015-0064532 A | 6/2015 |

OTHER PUBLICATIONS

Chinese Office Action dated Oct. 21, 2019 in Chinese Patent Application No. 201810506132.X.

*Primary Examiner* — Robert A. Siconolfi
*Assistant Examiner* — San M Aung
(74) *Attorney, Agent, or Firm* — Morgan, Lewis & Bockius LLP (57) ABSTRACT

The present invention relates to a valve structure of a shock absorber, in which a rebound-side stepped portion for supporting a rebound-side disc valve is integrally molded with an upper surface of a piston, and a compression-side inner stepped portion and a compression-side outer stepped portion for supporting a compression-side disc valve are integrally molded with a lower surface of the piston to omit a retainer for supporting a disc valve, thereby simplifying a structure and reducing manufacturing costs and weight of the valve structure, and a side surface of the piston is used to form compression channels, thereby easily securing a space.

10 Claims, 3 Drawing Sheets

(52) U.S. Cl.
CPC .... *F16K 31/1226* (2013.01); *F16F 2228/066* (2013.01); *F16F 2230/0023* (2013.01)

(58) Field of Classification Search
USPC ............ 188/322.13, 322.14, 322.15, 322.22, 188/280–281
See application file for complete search history.

(56) References Cited

U.S. PATENT DOCUMENTS

| | | | | |
|---|---|---|---|---|
| 2002/0134629 | A1* | 9/2002 | Bataille ................... | F16F 9/348 188/282.1 |
| 2006/0283676 | A1* | 12/2006 | Deferme ............... | F16F 9/3214 188/322.13 |
| 2012/0312648 | A1* | 12/2012 | Yu ......................... | F16F 9/5126 188/280 |
| 2013/0037361 | A1* | 2/2013 | Park ...................... | F16F 9/3481 188/322.15 |
| 2015/0198214 | A1* | 7/2015 | Mizuno ................. | F16F 9/3482 188/280 |

* cited by examiner

VALVE STRUCTURE OF SHOCK ABSORBER

TECHNICAL FIELD

The present invention relates to a valve structure of a shock absorber, and more particularly, to a valve structure of a shock absorber, in which a retainer for supporting a disc valve is omitted by integrally molding stepped portions for supporting a valve disc with upper and lower surfaces of a piston, thereby simplifying a structure and reducing manufacturing costs and weight of the valve structure, and in which compression channels are formed by using a side surface of the piston, thereby easily securing a space.

BACKGROUND ART

Generally, a shock absorber prevents vibration from being directly transferred to a vehicle body by absorbing and buffering vertical vibration energy transferred to vehicle wheels from an uneven road surface.

The shock absorber includes a cylinder filled with a working fluid such as oil, a piston valve movably installed in the cylinder and portioning the cylinder into a compression chamber and a rebound chamber, a piston rod connected to the piston valve, and a body valve fixed to a lower portion of the cylinder.

The piston valve includes a piston having main channels through which a fluid is moved during compression and rebound strokes, a disc valve disposed at each of upper and lower portions of the piston to generate a damping force, and a retainer disposed between the disc valve and the piston and forming channels through which a fluid is moved. The disc valve generates resistance to the flow of the fluid through compression and rebound channels, thereby implementing a damping force.

However, in an existing conventional piston valve, a retainer for supporting a disc valve is additionally coupled to an upper or lower portion of a piston, and thus, the number of components is increased to increase the manufacturing costs and weight thereof. In addition, since a channel should be formed within a diameter of the retainer, it is difficult to secure a space for forming the channel.

As the related art document related to the present invention, Korean Patent Laid-Open No. 10-2011-0026173 (Mar. 15, 2011) discloses a valve structure of a shock absorber.

Technical Problem

The present invention is directed to providing a valve structure of a shock absorber, in which a rebound-side stepped portion for supporting a rebound-side disc valve is integrally molded with an upper surface of a piston, and a compression-side inner stepped portion and a compression-side outer stepped portion for supporting a compression-side disc valve are integrally molded with a lower surface of the piston to omit a retainer for supporting a disc valve, thereby simplifying a structure and reducing manufacturing costs and weight of the valve structure, and a side surface of the piston is used to form compression channels, thereby easily securing a space. The present invention is directed to providing a valve structure of a shock absorber, in which a rebound-side support protrusion for supporting a rebound-side disc valve is additionally molded on an upper surface of a piston to prevent an intake disc from being deformed or damaged due to excessive deformation caused by an increased diameter of the intake disc, thereby improving durability of an apparatus.

Technical Solution

One aspect of the present invention provides a valve structure of a shock absorber which includes a piston dividing an interior of a cylinder filled with a fluid into a compression chamber and a rebound chamber in a state of being coupled to one end of a piston rod, and having main channels and compression channels formed outside the main channels, the valve structure including: an upper disc valve which is in close contact with an upper surface of the piston and is opened by pressure of a fluid discharged to an outlet side of the compression channels during a compression stroke to generate a damping force; a lower disc valve which is in close contact with a lower surface of the piston and is opened by pressure of a fluid discharged to an outlet side of the main channels during a rebound stroke to generate a damping force; and an auxiliary disc valve which is in close contact with a lower portion of the lower disc valve and is opened sequentially when the lower disc valve is opened, to generate a damping force, wherein a rebound-side stepped portion continuously protrudes along the outside of the main channels on the upper surface of the piston to support an edge of the upper disc valve, a compression-side inner stepped portion continuously protrudes along the outside of the main channels on the lower surface of the piston to support the lower disc valve, and a compression-side outer stepped portion continuously protrudes along a space between the compression-side inner stepped portion and the compression channels on the lower surface of the piston to support the auxiliary disc valve.

The compression-side outer stepped portion may protrude downward so as to be longer than the compression-side inner stepped portion.

Each of the compression channels may consist of a long hole so as to have a length in a circumferential direction of the piston.

Rebound-side support protrusions may protrude at set intervals along a space between the rebound-side stepped portion and the compression channels on the upper surface of the piston, and may support the edge of the upper disc valve in a state of being spaced apart from each other.

Each of the rebound-side support protrusions may protrude in a circular shape such that an edge thereof forms a circumference.

Each of the rebound-side support protrusions may protrude in a tapered shape such that a diameter thereof is gradually decreased toward an upper portion thereof.

When the edge of the upper disc valve deviates from the rebound-side stepped portion by a set length or more, the rebound-side support protrusions may support the edge of the upper disc valve.

The upper disc valve may include an intake disc of which an edge is supported by the rebound-side stepped portion and the rebound-side support protrusions, and which has a plurality of first through-holes such that a fluid of the rebound chamber is moved to an inlet side of the main channels during the rebound stroke, a rebound-side retainer which is in close contact with an upper surface of the intake disc, an intake spring which is in close contact with an upper surface of the retainer and has a plurality of support portions protruding along an edge thereof and elastically and downwardly supporting the intake disc, and a rebound-side washer which is in close contact with an upper surface of the intake spring and has second through-holes such that the fluid of the rebound chamber is moved to an inlet side of the first through-holes.

The lower disc valve may include a first lower disc which is in close contact with the lower surface of the piston and has a plurality of slits formed along an edge thereof, at least one second lower disc which is in close contact with a lower surface of the first lower disc, and a first compression-side retainer which is in close contact with a lower surface of the second lower disc, and the auxiliary disc valve may include a first main disc which has a diameter greater than that of the first lower disc, is in close contact with a lower surface of the compression-side retainer and of which an edge is supported by the compression-side outer stepped portion, at least one second main disc which is in close contact with a lower surface of the first main disc, at least one sub disc which is in close contact with a lower surface of the second main disc, a second compression-side retainer which is in close contact with a lower surface of the sub disc, and a compression-side washer which is in close contact with a lower surface of the second compression-side retainer.

Each of the rebound-side stepped portion, the compression-side inner stepped portion, and the compression-side outer stepped portion may protrude in a tapered shape such that a diameter thereof is gradually decreased toward an upper portion thereof.

Advantageous Effects

According to the present invention, a retainer for supporting a disc valve can be omitted to reduce manufacturing costs and weight, and a side surface of a piston can be used to form channels, thereby easily securing a space.

Further, according to the present invention, when an outer diameter of an intake disc is increased, it is possible to prevent the intake disc from being deformed and damaged due to excessive deformation, thereby improving durability of an apparatus.

MODES OF THE INVENTION

Hereinafter, exemplary embodiments according to the present invention will be described in detail with reference to the accompanying drawings.

The advantages, features, and schemes of achieving the advantages and features of the present exemplary embodiments will be made apparent to and comprehended by those skilled in the art based on the exemplary embodiments, which will be described later in detail, together with accompanying drawings.

The present exemplary embodiments are not limited to the following exemplary embodiments but include various applications and modifications. The present exemplary embodiments will make the disclosure of the present invention complete, and allow those skilled in the art to completely comprehend the scope of the present invention. The present exemplary embodiments are only defined within the scope of accompanying claims.

In addition, details of generally known technology that make the subject matter of the present exemplary embodiments unclear will be omitted in the following description.

Figure 1:
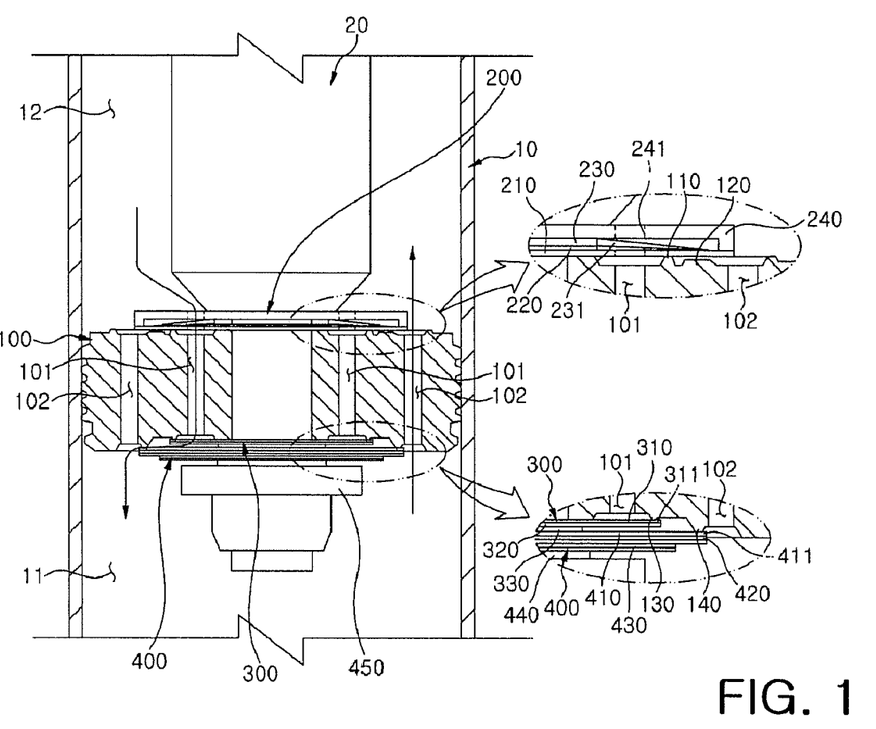
FIG. 1 is a cross-sectional view illustrating a valve structure of a shock absorber according to the present invention.
Figure 2:
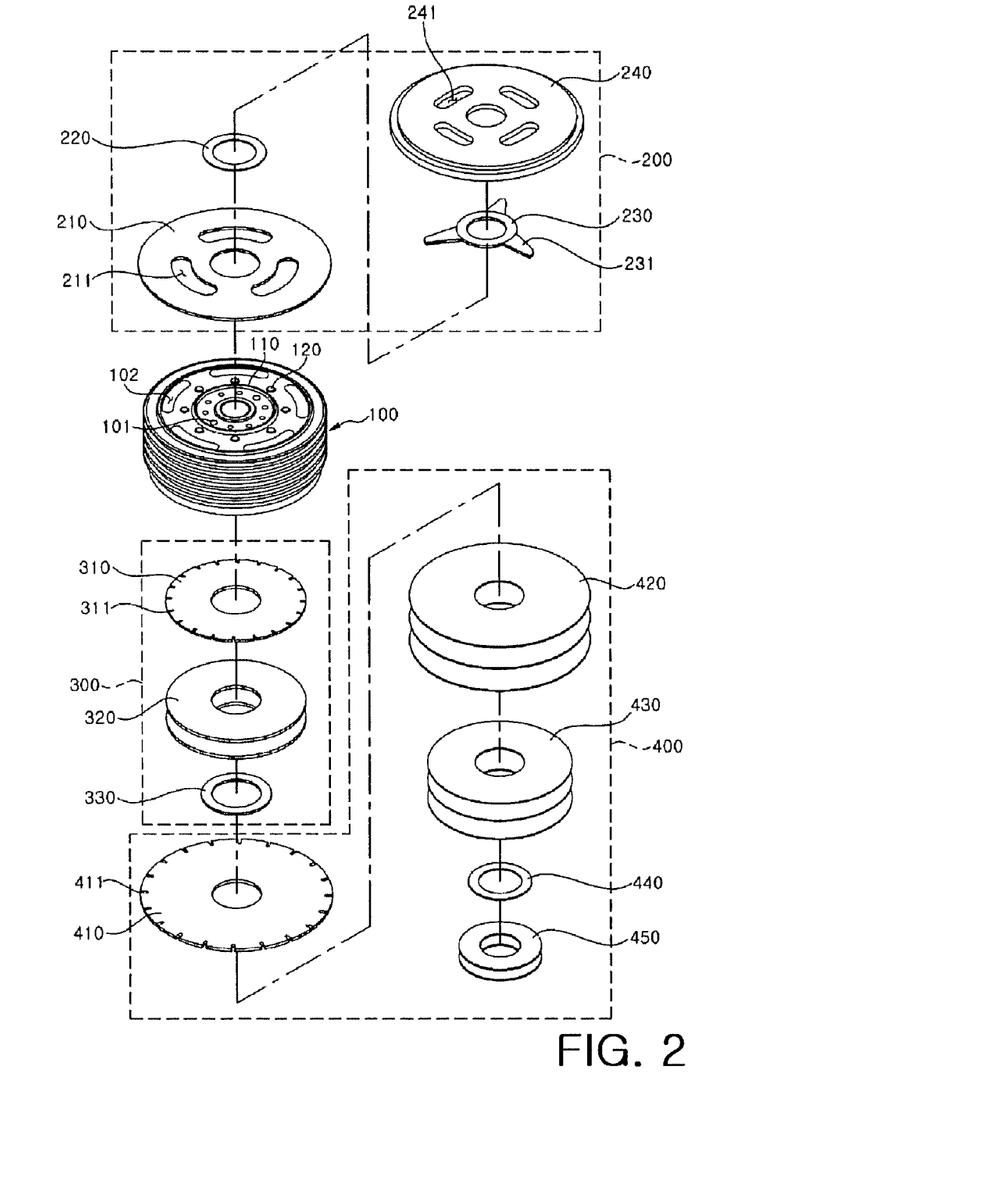
FIG. 2 is an exploded perspective view illustrating an arrangement state of a piston, an upper disc valve, and a lower disc valve in a valve structure of a shock absorber according to the present invention.

FIG. 1 is a cross-sectional view illustrating a valve structure of a shock absorber according to the present invention, and FIG. 2 is an exploded perspective view illustrating an arrangement state of a piston, an upper disc valve, and a lower disc valve in the valve structure of the shock absorber according to the present invention.

Figure 3:
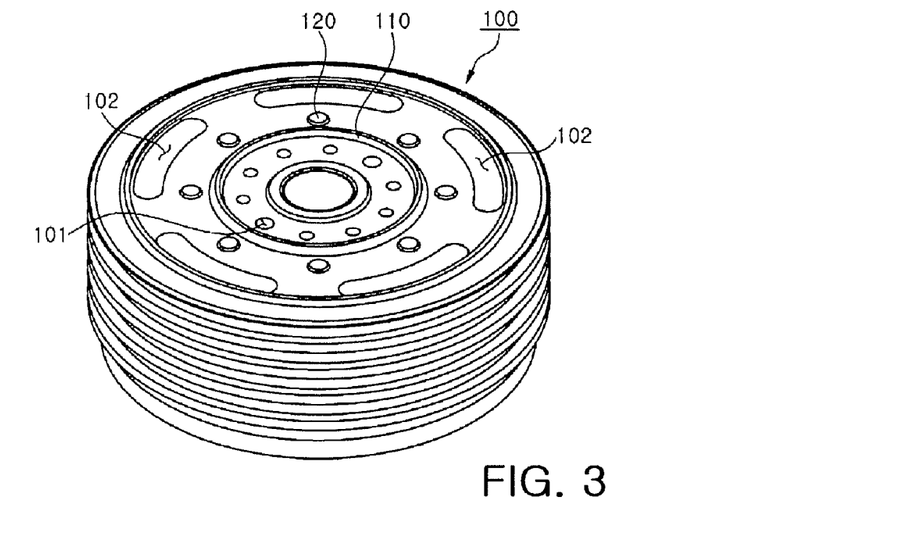
FIG. 3 is a perspective view illustrating an upper surface of a piston in a valve structure of a shock absorber according to the present invention.
Figure 4:
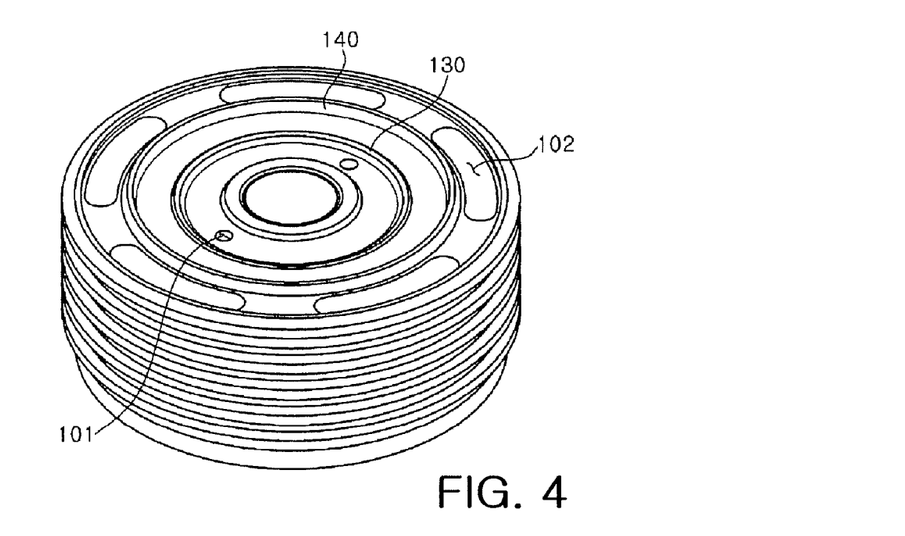
FIG. 4 is a perspective view illustrating a lower surface of a piston in a valve structure of a shock absorber according to the present invention.

In addition, FIG. 3 is a perspective view illustrating an upper surface of the piston in the valve structure of the shock absorber according to the present invention, and FIG. 4 is a perspective view illustrating a lower surface of the piston in the valve structure of the shock absorber according to the present invention.

The valve structure of the shock absorber according to the present invention generates a damping force while vertically moving inside the cylinder 10 during compression and rebound strokes.

Referring to FIGS. 1 to 4, the valve structure of the shock absorber according to the present invention includes the piston 100, the upper disc valve 200, the lower disc valve 300, and an auxiliary disc valve 400.

In particular, a rebound-side stepped portion 110 and rebound-side support protrusions 120 are formed on the upper surface of the piston 100, and a compression-side inner stepped portion 130 and a compression-side outer stepped portion 140 are formed on the lower surface of the piston.

First, the piston 100 is movably installed inside the cylinder 10 filled with a fluid and divides an interior of the cylinder 10 into a compression chamber 11 at a lower portion of the cylinder 10 and a rebound chamber 12 at an upper portion of the cylinder 10.

Here, the piston 100 is moved in compression and rebound directions in a state in which a side surface thereof is in close contact with an inner peripheral surface of the cylinder 10.

A hollow portion is vertically formed through a center of the piston 100 such that one end of a piston rod 20 extending into the cylinder 10 is coupled to pass through the piston.

In addition, a plurality of main channels 101 are formed in the piston 100 such that fluids are moved between the compression chamber 11 and the rebound chamber 12 during the compression and rebound strokes.

The plurality of main channels 101 may be radially formed with respect to a vertical center axis of the piston 100 and may be disposed at equal intervals in a circumferential direction of the piston 100.

Here, the main channels 101 are formed so as to vertically pass through the piston 100 such that a fluid of the rebound chamber 12 is moved to the compression chamber 11 when the piston 100 performs the rebound stroke.

The main channels 101 are disposed in a space between the hollow portion of the piston 100 and the rebound-side stepped portion 110 to be described later.

In addition, a plurality of compression channels 102 are formed in the piston 100 such that a fluid of the compression chamber 11 is moved to the rebound chamber 12 during the compression stroke.

The compression channels 102 are formed so as to vertically pass through the piston 100 such that the fluid of the compression chamber 11 is moved to the rebound chamber 12 when the piston performs the compression stroke.

The plurality of compression channels 102 may be radially formed with respect to the vertical center axis of the piston 100 and may be disposed at equal intervals in the circumferential direction of the piston 100.

The compression channels 102 are disposed along a space between an edge of the piston 100 and the rebound-side support protrusions 120 to be described later.

In addition, it is desirable that the compression channels 102 consist of long holes so as to have a length in the circumferential direction of the piston 100.

In this case, the compression channels 102 may have the same curvature as the circumferential direction of the piston 100. Both longitudinal ends of the compression channels 102 may have a semicircular shape convex in a radial direction of the piston 100.

That is, since the compression channels 102 of the present invention consist of long holes, the compression channels 102 may have a wide cross-sectional area and move a larger amount of fluid during strokes.

The rebound-side stepped portion 110 protrudes from the upper surface of the piston 100. The rebound-side stepped portion 110 continuously protrudes along the outside of the main channels 101.

Here, the rebound-side stepped portion 110 has a ring shape and is continuously formed in the circumferential direction of the piston 100 while maintaining the same distance from an edge of the piston 100.

In addition, the rebound-side stepped portion 110 may protrude in a tapered shape such that a diameter thereof is gradually decreased toward an upper portion thereof.

Furthermore, the rebound-side stepped portion 110 may be integrally molded with the upper surface of the piston 100 and may be formed together in a process of molding the piston 100.

An upper end of the rebound-side stepped portion 110 upwardly supports a lower surface of an intake disc 210 to be described later, as shown in FIG. 1.

The rebound-side support protrusions 120 protrude from the upper surface of the piston 100. A plurality of rebound-side support protrusions 120 are spaced apart from each other along a space between the rebound-side stepped portion 110 and the compression channels 102.

Here, the rebound-side support protrusions 120 may support an edge of the intake disc 210 to be described later in a state of being spaced apart from each other.

In this case, a certain distance may be formed between protruded ends of each of the rebound-side support protrusions 120 and the intake disc 210 to be described later. When the intake disc 210 is deformed during the rebound stroke, the intake disc 210 may be supported by the rebound-side support protrusions 120.

The rebound-side support protrusions 120 may desirably protrude in a circular shape such that an edge thereof forms a circumference as shown in FIGS. 2 and 3, but shapes of the rebound-side support protrusions 120 may be variously changed as needed.

In addition, the rebound-side support protrusions 120 may protrude in a tapered shape such that a diameter thereof is gradually decreased toward an upper portion thereof as shown in FIGS. 2 and 3.

Furthermore, the rebound-side support protrusions 120 may be integrally molded with the upper surface of the piston 100 and may be formed together in a process of molding the piston 100.

When the edge of the intake disc 210 to be described later deviates from the rebound-side stepped portion 110 by a set length or more, the above-described rebound-side support protrusions 120 may support the edge of the intake disc 210.

That is, when a diameter of the intake disc 210 to be described later is increased, the rebound-side support protrusions 120 support the edge of the intake disc 210 to prevent excessive deformation of the intake disc 210, thereby preventing the intake disc 210 from being damaged.

The compression-side inner stepped portion 130 protrudes from the lower surface of the piston 100. The compression-side inner stepped portion 130 continuously protrudes along the outside of the main channels 101.

Here, the compression-side inner stepped portion 130 has a ring shape and is continuously formed in the circumferential direction of the piston 100 while maintaining the same distance from the edge of the piston 100.

In addition, the compression-side inner stepped portion 130 may protrude in a tapered shape such that a diameter thereof is gradually decreased toward an upper portion thereof as shown in FIG. 4.

An upper end of the compression-side inner stepped portion 130 supports an upper surface of a first lower disc 310 to be described later, as shown in FIG. 1.

Furthermore, the compression-side inner stepped portion 130 may be integrally molded with the lower surface of the piston 100 and may be formed in a process of molding the piston 100.

The compression-side outer stepped portion 140 protrudes from the lower surface of the piston 100. The compression-side outer stepped portion 140 continuously protrudes along a space between the compression-side inner stepped portion 130 and the compression channels 102.

Here, the compression-side outer stepped portion 140 protrudes downward so as to be longer than the compression-side inner stepped portion. A lower end of the compression-side outer stepped portion 140 downwardly supports an upper surface of a first main disc 410 to be described later.

The compression-side outer stepped portion 140 has a ring shape, and compression-side outer stepped portion 140 is continuously formed in the circumferential direction of the piston 100 while maintaining the same distance from a peripheral surface of the compression-side inner stepped portion 130 and the edge of the piston 100.

In addition, as shown in FIG. 4, the compression-side outer stepped portion 140 may be formed in a tapered shape such that a diameter thereof is gradually decreased an upper portion thereof.

Furthermore, the compression-side outer stepped portion 140 may be integrally molded with the lower surface of the piston 100 and may be formed together in a process of molding the piston 100.

The upper disc valve 200 is in close contact with the upper surface of the piston 100 as shown in FIG. 1 and is opened by pressure of a fluid discharged through an outlet side of the compression channels 102 during a compression stroke to generate a damping force.

To this end, as shown in FIG. 2, the upper disc valve 200 includes the intake disc 210, a rebound-side retainer 220, an intake spring 230, and a rebound-side washer 240.

The intake disc 210 is in close contact with the upper surface of the piston 100 as shown in FIG. 1. The edge of the intake disc 210 is supported by the upper end of the rebound-side stepped portion 110.

For example, when the diameter of the intake disc 210 is greater than or equal to a set size, the edge of the intake disc 210 may be supported by the rebound-side support protrusions 120.

That is, when the diameter of the intake disc 210 is increased so as to be greater than or equal to the set size, the rebound-side support protrusions 120 may support the edge of the intake disc 210, thereby preventing the intake disc 210 from being damaged due to excessive deformation.

A plurality of first through-holes 211 are formed so as to vertically pass through the intake disc 210 such that the fluid of the rebound chamber 12 is moved to an inlet side of the main channels 101 during the rebound stroke.

The first through-holes 211 may be formed at a position connected to second-through-holes 241 to be described later such that the fluid of the rebound chamber 12 is moved to the compression chamber 11 through the main channels 101 during the rebound stroke.

In addition, the intake disc 210 has a disc shape, and the hollow portion is vertically formed through a center of the intake disc 201 such that the piston rod 20 is coupled to pass through the intake disc 201.

The rebound-side retainer 220 is in close contact with an upper surface of the intake disc 210 as shown in FIG. 1, and the hollow portion is vertically formed through a center of the rebound-side retainer 220 such that the piston rod 20 is coupled to pass through the rebound-side retainer 220.

Here, the rebound-side retainer 220 has a diameter less than that of the intake disc 210 and an outer diameter greater than that of the hollow portion of the intake disc 210.

The intake spring 230 is in close contact with an upper surface of the rebound-side retainer 220 as shown in FIG. 1, and a plurality of support portions 231 protrude along an edge of the intake spring 230.

The support portions 231 extend downward so as to be inclined downward and elastically and downwardly support the upper surface of the intake disc 210. To this end, the support portions 231 extend so as to be longer than the outer diameter of the rebound-side retainer 220.

The hollow portion is vertically formed through a center of the intake spring 230 such that the piston rod 20 is coupled to pass through the intake spring 230.

The rebound-side washer 240 is in close contact with an upper surface of the intake spring 230 as shown in FIG. 1, and the second though-holes 241 are formed in the rebound-side washer 240 such that the fluid of the rebound chamber 12 is moved to an inlet side of the first through-holes 211 during the rebound stroke.

The second through-holes 241 may be formed at a position connected to the first through-holes 211 such that the fluid of the rebound chamber 12 is moved to the compression chamber 11 through the main channels 101 during the rebound stroke.

The lower disc valve 300 is in close contact with the lower surface of the piston 100 as shown in FIG. 1 and is opened by pressure of a fluid discharged to an outlet side of the main channels 101 during the rebound stroke to generate the damping force.

To this end, the lower disc valve 300 includes the first lower disc 310, a second lower disc 320, and a first compression-side retainer 330.

The first lower disc 310 is in close contact with the lower surface of the piston 100, and a plurality of slits 311 are formed along an edge of the first lower disc 310.

Here, the hollow portion is vertically formed through a center of the first lower disc 310 such that the piston rod 20 is coupled to pass through the first lower disc 310.

The edge of the above-described first lower disc 310 is supported by the compression-side inner stepped portion 130 as shown in FIG. 1.

That is, when the piston 100 performs the rebound stroke, a fluid discharged through the outlet side of the main channels 101 may be discharged downward through the slits 311.

The second lower disc 320 is in close contact with a lower surface of the first lower disc 310, and the hollow portion is vertically formed through a center of the second lower disc 320 such that the piston rod 20 is coupled to pass through the second lower disc 320.

The above-described second lower disc 320 may generate a certain damping force by elastically supporting the lower surface of the first lower disc 310. Various numbers of the second lower discs 320 may be provided.

The second lower disc 320 may have the same diameter as the first lower disc 310, but the second lower disc 320 may have various diameters.

The first compression-side retainer 330 is in close contact with a lower surface of the second lower disc 320, and the hollow portion is vertically formed through a center of the first compression-side retainer 330 such that the piston rod 20 is coupled to pass through the first compression-side retainer 330.

Here, the first compression-side retainer 330 has a diameter less than that of the second lower disc 320 and an outer diameter greater than that of the hollow portion of the second lower disc 320.

The auxiliary disc valve 400 is in close contact with a lower portion of the lower disc valve 300 and is opened sequentially when the lower disc valve 300 is opened, to generate the damping force.

To this end, the auxiliary disc valve 400 includes a first main disc 410, a second main disc 420, a sub disc 430, a second compression-side retainer 440, and a compression-side washer 450.

The first main disc 410 has a diameter greater than that of the first lower disc 310 and is in close contact with a lower surface of the compression-side retainer 330. An edge of the first main disc 410 is supported by the compression-side outer stepped portion 140.

Here, the first main disc 410 has a disc shape, and a plurality of slits 411 are formed along the edge of the first main disc 410.

That is, when the piston 100 performs the rebound stroke, a fluid discharged through the outlet side of the main channels 101 may open the lower disc valve 300 and then may be moved to the compression chamber 11 through the slits 411 of the first main disc 410.

The hollow portion is vertically formed through a center of the first main disc 410 such that the piston rod 20 is coupled to pass through the first main disc 410.

The second main disc 420 is in close contact with a lower surface of the first main disc 410, and the hollow portion is vertically formed through a center of the second main disc 420 such that the piston rod 20 is coupled to pass through the second main disc 420.

The above-described second main disc 420 may generate a certain damping force by elastically supporting the lower surface of the first main disc 410. Various numbers of the second main discs 420 may be provided.

The second main disc 420 may have the same diameter as the first main disc 410, but the second main disc 420 may have various diameters.

The sub disc 430 is in close contact with a lower surface of the second main disc 420, and the hollow portion is vertically formed through a center of the subs disc 430 such that the piston rod 20 is coupled to pass through the sub disc 430.

The above-described sub disc 430 may generate a certain damping force by elastically supporting the lower surface of the second main disc 420. Various numbers of the sub discs 430 may be provided.

The second compression-side retainer 440 is in close contact with a lower surface of the sub disc 430, and the hollow portion is vertically formed through a center of the second compression-side retainer 440 such that the piston rod 20 is coupled to pass through the second compression-side retainer 440.

Here, the compression-side retainer 440 has a diameter less than that of the second main disc 420 and an outer diameter greater than that of the hollow portion of the second main disc 420.

The compression-side washer 450 is in close contact with a lower surface of the compression-side retainer 440, and the hollow portion is vertically formed through a center of the compression-side washer 450 such that the piston rod 20 is coupled to pass through the compression-side washer 450.

As a result, according to the present invention, the rebound-side stepped portion 110 for supporting the upper disc valve 200 may be integrally molded with the upper surface of the piston 100, and the compression-side inner stepped portion 130 and the compression-side outer step 140 for supporting the lower disc valve 300 may be integrally molded with the lower surface of the piston 100, a retainer for supporting a disc valve can be omitted to reduce manufacturing costs and weight, and the side surface of the piston can be used to form channels, thereby easily securing a space.

Further, according to the present invention, since the rebound-side support protrusion 120 for supporting the upper disc valve 200 is additionally molded on the upper surface of the piston 100, it is possible to prevent the intake disc 210 having an increased diameter from being deformed and damaged due to excessive deformation, thereby improving durability of an apparatus.

Although exemplary embodiments of the shock absorber according to the present invention have been described, it is apparent that various modifications can be made to the disclosed exemplary embodiments without departing from the scope of the present invention.

Thus, the scope of the present invention should not be limited to the disclosed exemplary embodiments, and should be defined by features of the following claims and equivalent features thereof.

That is, it should be construed that the disclosed exemplary embodiments are merely exemplary examples in all aspects and the scope of the present exemplary embodiments is defined by the following claims, rather than the detailed description, and all changes and modifications derived from the meaning, scope, and equivalent concepts of the claims are included in the scope of the present exemplary embodiments.

DESCRIPTION OF NUMERICAL REFERENCE

| | |
|---|---|
| 10: cylinder | 11: compression chamber |
| 12: rebound chamber | 20: piston rod |
| 100: piston | 101: main channel |
| 102: compression channel | 110: rebound-side stepped portion |
| 120: rebound-side support | 130: compression-side |
| protrusion stepped portion | inner |
| 140: compression-side outer stepped portion | 200: upper disc valve |
| 210: intake disc | 211: first through-hole |
| 220: rebound-side retainer | 230: intake spring |
| 231: support portion | 240: rebound-side washer |
| 241: second through-hole | 300: lower disc valve |
| 310: first lower disc | 311: slit |
| 320: second lower disc | 330: first compression-side retainer |
| 400: auxiliary disc valve | 410: first main disc |
| 411: slit | 420: second main disc |
| 430: sub disc | 440: second compression-side retainer |
| 450: compression-side washer | |

The invention claimed is:

1. A valve structure of a shock absorber which includes a piston dividing an interior of a cylinder filled with a fluid into a compression chamber and a rebound chamber in a state of being coupled to one end of a piston rod, and having main channels and compression channels formed outside the main channels, the valve structure comprising:

an upper disc valve which is in close contact with an upper surface of the piston and is opened by pressure of a fluid discharged to an outlet side of the compression channels during a compression stroke to generate a damping force;

a lower disc valve which is in close contact with a lower surface of the piston and is opened by pressure of a fluid discharged to an outlet side of the main channels during a rebound stroke to generate a damping force; and an auxiliary disc valve which is in close contact with a lower portion of the lower disc valve and is opened sequentially when the lower disc valve is opened, to generate a damping force, wherein a rebound-side stepped portion continuously protrudes along the outside of the main channels on the upper surface of the piston to support an edge of the upper disc valve, a compression-side inner stepped portion continuously protrudes along the outside of the main channels on the lower surface of the piston to support the lower disc valve, and a compression-side outer stepped portion continuously protrudes along a space between the compression-side inner stepped portion and the compression channels on the lower surface of the piston to support the auxiliary disc valve, and the compression-side outer stepped portion is arranged radially inward of an exit port of the compression channels.

2. The valve structure of claim 1, wherein the compression-side outer stepped portion protrudes downward so as to be longer than the compression-side inner stepped portion.

3. The valve structure of claim 1, wherein each of the compression channels consists of a long hole so as to have a length in a circumferential direction of the piston.

4. The valve structure of claim 1, wherein rebound-side support protrusions protrude at set intervals along a space between the rebound-side stepped portion and the compression channels on the upper surface of the piston, and support the edge of the upper disc valve in a state of being spaced apart from each other.

5. The valve structure of claim 4, wherein each of the rebound-side support protrusions protrudes in a circular shape such that an edge thereof forms a circumference.

6. The valve structure of claim 4, wherein each of the rebound-side support protrusions protrudes in a tapered shape such that a diameter thereof is gradually decreased toward an upper portion thereof.

7. The valve structure of claim 4, wherein, when the edge of the upper disc valve deviates from the rebound-side stepped portion by a set length or more, the rebound-side support protrusions support the edge of the upper disc valve.

8. The valve structure of claim 4, wherein the upper disc valve includes an intake disc of which an edge is supported by the rebound-side stepped portion and the rebound-side support protrusions, and which has a plurality of first through-holes such that a fluid of the rebound chamber is moved to an inlet side of the main channels during the rebound stroke,
- a rebound-side retainer which is in close contact with an upper surface of the intake disc,
- an intake spring which is in close contact with an upper surface of the retainer and has a plurality of support portions protruding along an edge thereof and elastically and downwardly supporting the intake disc, and
- a rebound-side washer which is in close contact with an upper surface of the intake spring and has second through-holes such that the fluid of the rebound chamber is moved to an inlet side of the first through-holes.

9. The valve structure of claim 1, wherein the lower disc valve includes a first lower disc which is in close contact with the lower surface of the piston and has a plurality of slits formed along an edge thereof,
- at least one second lower disc which is in close contact with a lower surface of the first lower disc, and
- a first compression-side retainer which is in close contact with a lower surface of the second lower disc, and
- wherein the auxiliary disc valve includes a first main disc which has a diameter greater than that of the first lower disc, is in close contact with a lower surface of the compression-side retainer and of which an edge is supported by the compression-side outer stepped portion,
- at least one second main disc which is in close contact with a lower surface of the first main disc,
- at least one sub disc which is in close contact with a lower surface of the second main disc,
- a second compression-side retainer which is in close contact with a lower surface of the sub disc, and
- a compression-side washer which is in close contact with a lower surface of the second compression-side retainer.

10. The valve structure of claim 1, wherein each of the rebound-side stepped portion, the compression-side inner stepped portion, and the compression-side outer stepped portion protrudes in a tapered shape such that a diameter thereof is gradually decreased toward an upper portion thereof.

* * * * *